United States Patent
You et al.

(10) Patent No.: US 12,218,730 B2
(45) Date of Patent: Feb. 4, 2025

(54) APPARATUS AND METHOD OF WIRELESS COMMUNICATION

(71) Applicant: GUANGDONG OPPO MOBILE TELECOMMUNICATIONS CORP., LTD., Dongguan (CN)

(72) Inventors: Xin You, Dongguan (CN); Cong Shi, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 297 days.

(21) Appl. No.: 17/699,822

(22) Filed: Mar. 21, 2022

(65) Prior Publication Data
US 2022/0209840 A1    Jun. 30, 2022

Related U.S. Application Data

(63) Continuation of application No. PCT/CN2020/129769, filed on Nov. 18, 2020.
(Continued)

(51) Int. Cl.
*H04W 76/19* (2018.01)
*H04B 7/06* (2006.01)
(Continued)

(52) U.S. Cl.
CPC ...... *H04B 7/0686* (2013.01); *H04W 72/1263* (2013.01); *H04W 72/23* (2023.01); *H04W 76/19* (2018.02); *H04W 80/02* (2013.01)

(58) Field of Classification Search
CPC .............. H04B 7/0686; H04B 7/0695; H04W 72/1263; H04W 72/23; H04W 76/19; H04W 72/21
See application file for complete search history.

(56) References Cited

U.S. PATENT DOCUMENTS

| | | | |
|---|---|---|---|
| 11,444,676 B2 * | 9/2022 | Takeda | H04W 74/0833 |
| 11,924,755 B2 * | 3/2024 | Kaikkonen | H04W 52/0274 |

(Continued)

FOREIGN PATENT DOCUMENTS

| | | |
|---|---|---|
| WO | 2019032882 A1 | 2/2019 |
| WO | 2019192476 A1 | 10/2019 |

(Continued)

OTHER PUBLICATIONS

International Search Report and the Written Opinion Dated Feb. 5, 2021 From the International Searching Authority Re. Application No. PCT/CN2020/129769, 10 pages.
(Continued)

*Primary Examiner* — Syed Ali
(74) *Attorney, Agent, or Firm* — BAYES PLLC (57) ABSTRACT

An apparatus and a method of wireless communication are provided. The method by a user equipment (UE) includes performing, by the UE, one or more of generating a beam failure recovery (BFR) medium access control (MAC) control element (CE) and triggering a scheduling request (SR) for BFR if the UE determines that at least one BFR has been triggered and not cancelled. This can solve issues in the prior art, provide MAC CE and/or SR transmission for BFR, provide a good communication performance, and/or provide high reliability.

11 Claims, 2 Drawing Sheets

Related U.S. Application Data (60) Provisional application No. 62/939,556, filed on Nov. 22, 2019.

(51) Int. Cl.
*H04W 72/1263* (2023.01)
*H04W 72/23* (2023.01)
*H04W 80/02* (2009.01)

(56) References Cited

U.S. PATENT DOCUMENTS

| | | | |
|---|---|---|---|
| 2019/0089579 A1* | 3/2019 | Sang | H04W 40/36 |
| 2019/0200248 A1* | 6/2019 | Basu Mallick | H04W 24/04 |
| 2019/0229967 A1* | 7/2019 | Frank | H04L 5/0041 |
| 2019/0274098 A1 | 9/2019 | Cheng et al. | |
| 2019/0281480 A1 | 9/2019 | Wei et al. | |
| 2019/0313263 A1 | 10/2019 | Jung et al. | |
| 2020/0045745 A1* | 2/2020 | Cirik | H04W 72/23 |
| 2020/0252990 A1* | 8/2020 | Ganesan | H04W 76/14 |
| 2021/0028848 A1* | 1/2021 | Tsai | H04W 72/23 |
| 2022/0279366 A1* | 9/2022 | Matsumura | H04W 24/04 |
| 2022/0294512 A1* | 9/2022 | Matsumura | H04W 72/1263 |
| 2022/0311498 A1* | 9/2022 | Loehr | H04W 72/1263 |
| 2022/0322325 A1* | 10/2022 | Svedman | H04L 5/0051 |
| 2022/0329312 A1* | 10/2022 | Matsumura | H04W 72/21 |
| 2024/0120988 A1* | 4/2024 | Yu | H04B 7/088 |

FOREIGN PATENT DOCUMENTS

| | | |
|---|---|---|
| WO | 2019192713 A1 | 10/2019 |
| WO | 2019196885 A1 | 10/2019 |

OTHER PUBLICATIONS

MediaTek Inc., "Enhancements on multi-beam operations", 3GPP TSG RAN WG1 #96bis, R1-1904476, Xi'an, China, Apr. 8-12, 2019, 12 pages.

Apple,, "[Draft] Reply LS on SCell BFR Operation", 3GPP TSG-RAN WG2 Meeting #107, R2-1913880,Oct. 18, 2019, 2 pages.

Nokia, Nokia Shanghai Bell,, "Summary of [107bis#61][NR eMIMO] Scell BFR MAC CR (Nokia, Samsung)", 3GPP TSG-RAN WG2 Meeting #108, R2-1915331, Oct. 18, 2019 , 46 pages.

The supplementary European search report dated Oct. 7, 2022 from European patent Application No. 20890685.9.

Nokia et al., "Introduction of SCell BFR", 3GPP Draft; R2-1913225 Draft CR on Introduction of SCell BFR, 3rd Generation Partnership Project (3GPP), vol. RAN WG2, No. Chongqing, China; Oct. 14, 2019-Oct. 18, 2019, Oct. 4, 2019 (Oct. 4, 2019), the whole document.

The Examination Report dated Jun. 7, 2023 from European patent application No. 20890685.9.

MediaTek Inc., "Support BFR for SCell", 3GPP Draft; R2-1913240 3rd Generation Partnership Project (3GPP), vol. RAN WG2, No. Chongqing, China; Oct. 14, 2019-Oct. 18, 2019, Oct. 4, 2019 (Oct. 4, 2019), the whole document.

The First Office Action dated Jul. 2, 2024 from Chinese patent application No. 202310469159.7.

The Second Office Action dated Sep. 25, 2024 from Chinese patent application No. 202310469159.7., 14 pages.

\* cited by examiner

APPARATUS AND METHOD OF WIRELESS COMMUNICATION

CROSS REFERENCE TO RELATED APPLICATIONS

This application is a continuation of International Application No. PCT/CN2020/129769, filed on Nov. 18, 2020, which claims the benefits of U.S. provisional application No. 62/939,556, field on Nov. 22, 2019. The entire disclosures of these applications are incorporated herein by reference.

BACKGROUND

1. Field of the Disclosure

The present disclosure relates to the field of communication systems, and more particularly, to an apparatus and a method of wireless communication, which can provide a good communication performance and/or high reliability.

2. Description of the Related Art

Wireless communication systems are widely deployed to provide various types of communication content such as voice, video, packet data, messaging, broadcast, and so on. These wireless communication systems may be capable of supporting communication with multiple users by sharing available system resources (e.g., time, frequency, and power). Examples of such multiple-access systems include fourth generation (4G) systems such as long term evolution (LTE) systems and fifth generation (5G) systems which may be referred to as new radio (NR) systems. A wireless multiple-access communications system may include a number of base stations or network access nodes, each simultaneously supporting communication for multiple communication devices, which may be otherwise known as user equipments (UEs).

A wireless communication network may include a base station that can support communication for a UE. The UE may communicate with the base station via downlink and uplink. The downlink refers to a communication link from the base station to the UE, and the uplink refers to a communication link from the UE to the base station. In the wireless communication system operating in high frequency bands, paging transmission/reception leads to increased signaling overhead and UE power consumption. Further, whether the UE can transmit a beam failure recovery (BFR) medium access control (MAC) control element (CE) using uplink (UL) grant of any serving cell or whether there is a restriction for the UE not to transmit the BFR MAC CE on failed serving cell(s) is still an open issue.

Therefore, there is a need for an apparatus (such as a user equipment (UE) and/or a base station) and a method of wireless communication, which can solve issues in the prior art, provide MAC CE and/or scheduling request (SR) transmission for BFR, provide a good communication performance, and/or provide high reliability.

SUMMARY

An object of the present disclosure is to propose an apparatus (such as a user equipment (UE) and/or a base station) and a method of wireless communication, which can solve issues in the prior art, provide medium access control (MAC) control element (CE) and/or scheduling request (SR) transmission for beam failure recovery (BFR), provide a good communication performance, and/or provide high reliability.

In a first aspect of the present disclosure, a method of wireless communication by a user equipment (UE), comprising performing, by the UE, one or more of generating a beam failure recovery (BFR) medium access control (MAC) control element (CE) and triggering a scheduling request (SR) for BFR if the UE determines that at least one BFR has been triggered and not cancelled.

In a second aspect of the present disclosure, a method of wireless communication by a base station comprising receiving, from a user equipment (UE) by the base station, one or more of a beam failure recovery (BFR) medium access control (MAC) control element (CE) and a scheduling request (SR) for BFR if the base station determines that at least one BFR has been triggered and not cancelled.

In a third aspect of the present disclosure, a user equipment comprises a memory, a transceiver, and a processor coupled to the memory and the transceiver. The processor performs one or more of generating a beam failure recovery (BFR) medium access control (MAC) control element (CE) and triggering a scheduling request (SR) for BFR if the processor determines that at least one BFR has been triggered and not cancelled.

In a fourth aspect of the present disclosure, a base station comprises a memory, a transceiver, and a processor coupled to the memory and the transceiver. The transceiver receives, from a user equipment (UE), one or more of a beam failure recovery (BFR) medium access control (MAC) control element (CE) and a scheduling request (SR) for BFR if the processor determines that at least one BFR has been triggered and not cancelled.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In radio layer 1 (RAN1) Liaison Specification (LS) reply for secondary cell (SCell) beam failure recovery (BFR), current discussions are made as following. Question: Can a UE transmit a BFR medium access control (MAC) control element (CE) using uplink (UL) grant of any serving cell or should there be a restriction not to send the BFR MAC CE on failed serving cell(s)? Reply: At least from RAN1 perspective, there is no need for introducing such restrictions on MAC CE transmission for BFR in a release 16 (Rel-16). Further, RAN1 may not see a strong motivation for restriction, drawbacks of sending the BFR MAC CE on a failed SCell can be further study and discussion. Therefore, whether the UE can transmit a BFR medium access control (MAC) control element (CE) using uplink (UL) grant of any serving cell or whether there is a restriction for the UE not to transmit the BFR MAC CE on failed serving cell(s) is still an open issue.

Therefore, some embodiments of the present disclosure propose an apparatus (such as a user equipment (UE) and/or a base station) and a method of wireless communication, which can solve issues in the prior art, provide MAC CE and/or SR transmission for BFR, provide a good communication performance, and/or provide high reliability.

Figure 1:
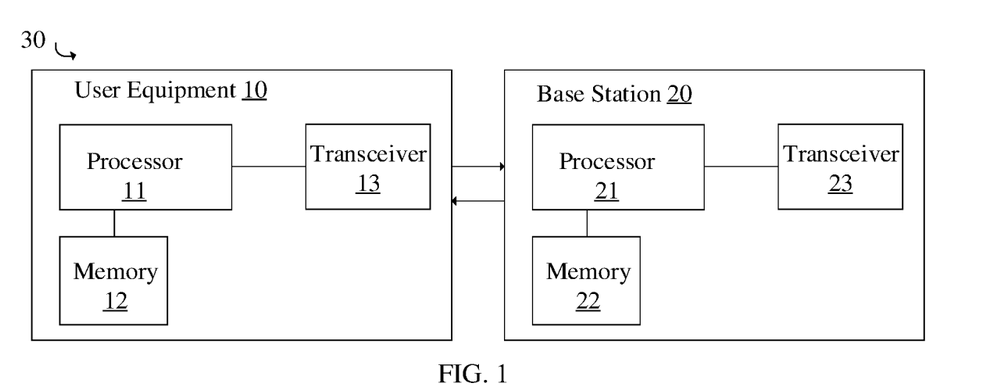
FIG. 1 is a block diagram of one or more user equipments (UEs) and a base station of wireless communication in a communication network system according to an embodiment of the present disclosure.

FIG. 1 illustrates that, in some embodiments, one or more user equipments (UEs) 10 and a base station (e.g., gNB or eNB) 20 for wireless communication in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals.

When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 performs one or more of generating a beam failure recovery (BFR) medium access control (MAC) control element (CE) and triggering a scheduling request (SR) for BFR if the processor 11 determines that at least one BFR has been triggered and not cancelled. This can solve issues in the prior art, provide MAC CE and/or SR transmission for BFR, provide a good communication performance, and/or provide high reliability.

In some embodiments, the processor 11 determines that the at least one BFR has been triggered and not cancelled is determined in a BFR procedure.

In some embodiments, the BFR MAC CE is generated in a multiplexing and assembly procedure. The multiplexing and assembly procedure may comprise a logical channel prioritization (LCP) procedure.

In some embodiments, the BFR MAC CE comprises a secondary cell (SCell) BFR MAC CE. In some embodiments, triggering the SR for BFR comprises triggering the SR for SCell BFR for each SCell for which BFR has been triggered and not cancelled.

In some embodiments, if uplink shared channel (UL-SCH) resources are available for a new transmission and if the UL-SCH resources can accommodate the BFR MAC CE plus its subheader as a result of logical channel prioritization (LCP), the processor 11 generates the BFR MAC CE.

In some embodiments, the BFR MAC CE comprises a truncated BFR MAC CE.

In some embodiments, if UL-SCH resources are available for a new transmission and if the UL-SCH resources can accommodate the BFR MAC CE plus its subheader as a result of LCP, the processor 11 generates the BFR MAC CE and triggers the SR for SCell BFR.

In some embodiments, the transceiver 13 is allowed to transmit the BFR MAC CE on any UL grant, and if there is only available UL grant on a failed SCell, the processor 11 triggers and control the transceiver 13 transmits the BFR MAC CE with the UL grant on the failed SCell, and the processor 11 triggers the SR for BFR.

In some embodiments, if only UL-SCH resources on a failed SCell are available for a new transmission and if the UL-SCH resources can accommodate the BFR MAC CE plus its subheader as a result of LCP, the processor 11 triggers the SR for SCell BFR.

In some embodiments, the transceiver 13 is allowed to transmit the BFR MAC CE on any UL grant except an UL grant on a failed SCell.

In some embodiments, if there is no available UL grant except on the failed SCell, the processor 11 triggers the SR for BFR to acquire an UL grant for BFR MAC CE transmission.

In some embodiments, if UL-SCH resources on a failed SCell and a non-failed SCell are available for a new transmission and if the UL-SCH resources can accommodate the BFR MAC CE plus its subheader as a result of LCP, the processor 11 generates the BFR MAC CE on the non-failed SCell.

In some embodiments, if there are available UL grants on the failed SCell and the non-failed SCell, the processor 11 skips the available UL grant on the failed SCell and uses the available UL grant on the non-failed SCell for BFR MAC CE transmission.

In some embodiments, the processor 11 skipping the available UL grant on the failed SCell comprises the processor 11 regarding the available UL grant on the failed SCell as an invalid UL grant. In some embodiments, if there are multiple available UL grants on the non-failed SCell, the processor 11 can choose the UL grant on the non-failed SCell according to one or more of the followings: UE implementation, choosing a closest available UL grant on time domain, and choosing a SCell with a strongest radio condition.

In some embodiments, the transceiver 23 receives, from the user equipment (UE) 10, one or more of a beam failure recovery (BFR) medium access control (MAC) control element (CE) and a scheduling request (SR) for BFR if the processor 21 determines that at least one BFR has been triggered and not cancelled. This can solve issues in the prior art, provide MAC CE and/or SR transmission for BFR, provide a good communication performance, and/or provide high reliability.

In some embodiments, the processor 21 determines that the at least one BFR has been triggered and not cancelled in a BFR procedure.

In some embodiments, the BFR MAC CE is generated in a multiplexing and assembly procedure.

In some embodiments, the BFR MAC CE comprises a secondary cell (SCell) BFR MAC CE.

In some embodiments, receiving, from the UE 10 by the transceiver 23, the SR for BFR comprises receiving, from the UE 10 by the transceiver 23, the SR for SCell BFR for each SCell for which BFR has been triggered and not cancelled.

In some embodiments, if uplink shared channel (UL-SCH) resources are available for a new transmission and if the UL-SCH resources can accommodate the BFR MAC CE plus its subheader as a result of logical channel prioritization (LCP), the transceiver 23 receives the BFR MAC CE from the UE 10.

In some embodiments, the BFR MAC CE comprises a truncated BFR MAC CE.

In some embodiments, if UL-SCH resources are available for a new transmission and if the UL-SCH resources can accommodate the BFR MAC CE plus its subheader as a result of LCP, the transceiver 23 receives, from the UE 10, the BFR MAC CE and the SR for SCell BFR.

In some embodiments, the transceiver 23 is configured to receive the BFR MAC CE on any UL grant, and if there is only available UL grant on a failed SCell, the transceiver 23 receives, from the UE 10, the BFR MAC CE with the UL grant on the failed SCell, and the transceiver 23 receives the SR for BFR from the UE 10.

In some embodiments, if only UL-SCH resources on a failed SCell are available for a new transmission and if the UL-SCH resources can accommodate the BFR MAC CE plus its subheader as a result of LCP, the transceiver 23 receives the SR for SCell BFR from the UE 10.

In some embodiments, the transceiver 23 is configured to receive the BFR MAC CE on any UL grant except an UL grant on a failed SCell.

In some embodiments, if there is no available UL grant except on the failed SCell, the transceiver 23 receives the SR for BFR from the UE 10 and the processor 21 allows the UE 10 to acquire an UL grant for BFR MAC CE transmission.

In some embodiments, if UL-SCH resources on a failed SCell and a non-failed SCell are available for a new transmission and if the UL-SCH resources can accommodate the BFR MAC CE plus its subheader as a result of LCP, the transceiver 23 receives, from the UE 10, the BFR MAC CE on the non-failed SCell.

In some embodiments, if there are available UL grants on the failed SCell and the non-failed SCell, the available UL grant on the failed SCell is skipped and the available UL grant on the non-failed SCell for BFR MAC CE transmission is used.

In some embodiments, skipping the available UL grant on the failed SCell comprises regarding the available UL grant on the failed SCell as an invalid UL grant.

In some embodiments, if there are multiple available UL grants on the non-failed SCell, the UL grant on the non-failed SCell is selected according to one or more of the followings: UE implementation, choosing a closest available UL grant on time domain, and choosing a SCell with a strongest radio condition.

Figure 2:
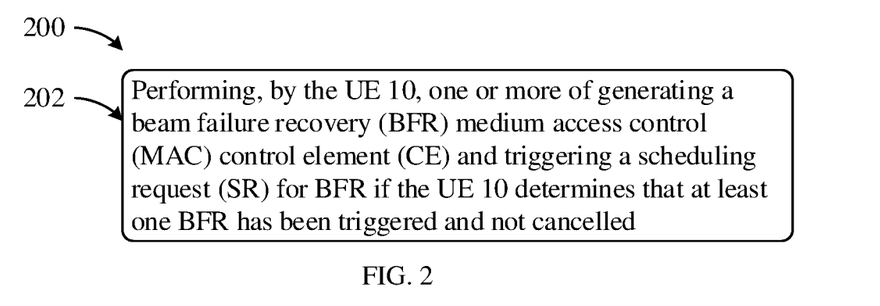
FIG. 2 is a flowchart illustrating a method of wireless communication performed by a user equipment (UE) according to an embodiment of the present disclosure.

FIG. 2 illustrates a method 200 of wireless communication by a user equipment (UE) 10 according to an embodiment of the present disclosure.

In some embodiments, the method 200 includes: a block 202, performing, by the UE 10, one or more of generating a beam failure recovery (BFR) medium access control (MAC) control element (CE) and triggering a scheduling request (SR) for BFR if the UE 10 determines that at least one BFR has been triggered and not cancelled. This can solve issues in the prior art, provide MAC CE and/or SR transmission for BFR, provide a good communication performance, and/or provide high reliability.

In some embodiments, the UE 10 determines that the at least one BFR has been triggered and not cancelled in a BFR procedure.

In some embodiments, the BFR MAC CE is generated in a multiplexing and assembly procedure.

In some embodiments, the BFR MAC CE comprises a secondary cell (SCell) BFR MAC CE. In some embodiments, triggering the SR for BFR comprises triggering the SR for SCell BFR for each SCell for which BFR has been triggered and not cancelled.

In some embodiments, if uplink shared channel (UL-SCH) resources are available for a new transmission and if the UL-SCH resources can accommodate the BFR MAC CE plus its subheader as a result of logical channel prioritization (LCP), the UE 10 generates the BFR MAC CE.

In some embodiments, the BFR MAC CE comprises a truncated BFR MAC CE.

In some embodiments, if UL-SCH resources are available for a new transmission and if the UL-SCH resources can accommodate the BFR MAC CE plus its subheader as a result of LCP, the UE 10 generates the BFR MAC CE and triggers the SR for SCell BFR.

In some embodiments, the UE 10 is allowed to transmit the BFR MAC CE on any UL grant, and if there is only available UL grant on a failed SCell, the UE 10 triggers and transmits the BFR MAC CE with the UL grant on the failed SCell, and the UE 10 triggers the SR for BFR.

In some embodiments, if only UL-SCH resources on a failed SCell are available for a new transmission and if the UL-SCH resources can accommodate the BFR MAC CE plus its subheader as a result of LCP, the UE 10 triggers the SR for SCell BFR.

In some embodiments, the UE 10 is allowed to transmit the BFR MAC CE on any UL grant except an UL grant on a failed SCell.

In some embodiments, if there is no available UL grant except on the failed SCell, the UE 10 triggers the SR for BFR to acquire an UL grant for BFR MAC CE transmission.

In some embodiments, if UL-SCH resources on a failed SCell and a non-failed SCell are available for a new transmission and if the UL-SCH resources can accommodate the BFR MAC CE plus its subheader as a result of LCP, the UE 10 generates the BFR MAC CE on the non-failed SCell. In some embodiments, if there are available UL grants on the failed SCell and the non-failed SCell, the UE 10 skips the available UL grant on the failed SCell and uses the available UL grant on the non-failed SCell for BFR MAC CE transmission.

In some embodiments, the UE 10 skipping the available UL grant on the failed SCell comprises the UE 10 regarding the available UL grant on the failed SCell as an invalid UL grant.

In some embodiments, if there are multiple available UL grants on the non-failed SCell, the UE 10 can choose the UL grant on the non-failed SCell according to one or more of the followings: UE implementation, choosing a closest available UL grant on time domain, and choosing a SCell with a strongest radio condition.

Figure 3:
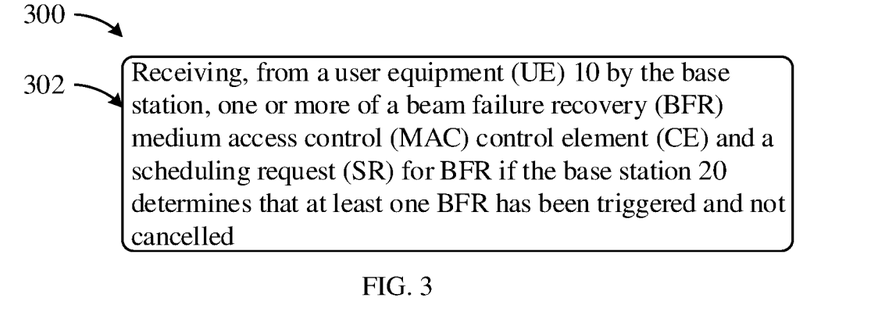
FIG. 3 is a flowchart illustrating a method of wireless communication performed by a base station according to an embodiment of the present disclosure.

FIG. 3 illustrates a method 300 of wireless communication by a base station 20 according to an embodiment of the present disclosure.

In some embodiments, the method 300 includes: a block 302, receiving, from a user equipment (UE) 10 by the base station, one or more of a beam failure recovery (BFR) medium access control (MAC) control element (CE) and a scheduling request (SR) for BFR if the base station 20 determines that at least one BFR has been triggered and not cancelled. This can solve issues in the prior art, provide MAC CE and/or SR transmission for BFR, provide a good communication performance, and/or provide high reliability.

In some embodiments, the base station 20 determines that the at least one BFR has been triggered and not cancelled in a BFR procedure.

In some embodiments, the BFR MAC CE is generated in a multiplexing and assembly procedure.

In some embodiments, the BFR MAC CE comprises a secondary cell (SCell) BFR MAC CE.

In some embodiments, receiving, from the UE 10 by the base station 20, the SR for BFR comprises receiving, from the UE 10 by the base station 20, the SR for SCell BFR for each SCell for which BFR has been triggered and not cancelled.

In some embodiments, if uplink shared channel (UL-SCH) resources are available for a new transmission and if the UL-SCH resources can accommodate the BFR MAC CE plus its subheader as a result of logical channel prioritization (LCP), the base station 20 receives the BFR MAC CE from the UE 10.

In some embodiments, the BFR MAC CE comprises a truncated BFR MAC CE.

In some embodiments, if UL-SCH resources are available for a new transmission and if the UL-SCH resources can accommodate the BFR MAC CE plus its subheader as a result of LCP, the base station 20 receives, from the UE 10, the BFR MAC CE and the SR for SCell BFR.

In some embodiments, the base station 20 is configured to receive the BFR MAC CE on any UL grant, and if there is only available UL grant on a failed SCell, the base station 20 receives, from the UE 10, the BFR MAC CE with the UL grant on the failed SCell, and the base station 20 receives the SR for BFR from the UE 10.

In some embodiments, if only UL-SCH resources on a failed SCell are available for a new transmission and if the UL-SCH resources can accommodate the BFR MAC CE plus its subheader as a result of LCP, the base station 20 receives the SR for SCell BFR from the UE 10.

In some embodiments, the base station 20 is configured to receive the BFR MAC CE on any UL grant except an UL grant on a failed SCell.

In some embodiments, if there is no available UL grant except on the failed SCell, the base station 20 receives the SR for BFR from the UE 10 and allows the UE 10 to acquire an UL grant for BFR MAC CE transmission.

In some embodiments, if UL-SCH resources on a failed SCell and a non-failed SCell are available for a new transmission and if the UL-SCH resources can accommodate the BFR MAC CE plus its subheader as a result of LCP, the base station 20 receives, from the UE 10, the BFR MAC CE on the non-failed SCell.

In some embodiments, if there are available UL grants on the failed SCell and the non-failed SCell, the available UL grant on the failed SCell is skipped and the available UL grant on the non-failed SCell for BFR MAC CE transmission is used.

In some embodiments, skipping the available UL grant on the failed SCell comprises regarding the available UL grant on the failed SCell as an invalid UL grant.

In some embodiments, if there are multiple available UL grants on the non-failed SCell, the UL grant on the non-failed SCell is selected according to one or more of the followings: UE implementation, choosing a closest available UL grant on time domain, and choosing a SCell with a strongest radio condition.

MAC Entities:

FIG. 1 illustrates that, in some embodiments, MAC entity of the UE 10 handles the following transport channels: broadcast channel (BCH), downlink shared channel(s) (DL-SCH), paging channel (PCH), uplink shared channel(s) (UL-SCH), and random access channel(s) (RACH). In addition, the MAC entity of the UE 10 handles the following transport channel for sidelink: sidelink shared channel (SL-SCH), and sidelink broadcast channel (SL-BCH). When the UE 10 is configured with SCG, two MAC entities are configured to the UE: one for a master cell group (MCG) and one for a secondary cell group (SCG). If the MAC entity is configured with one or more SCells, there are multiple DL-SCHs and there may be multiple UL-SCHs as well as multiple RACHs per MAC entity, one DL-SCH, one UL-SCH, and one RACH on a special Cell (SpCell), one DL-SCH, zero or one UL-SCH, and zero or one RACH for each SCell.

In some embodiments, for dual connectivity operation, the term SpCell refers to a primary cell (PCell) of the MCG or a primary SCell (pSCell) of the SCG depending on if the MAC entity is associated to the MCG or the SCG, respectively. Otherwise the term SpCell refers to the PCell. A SpCell supports a physical uplink control channel (PUCCH) transmission and a contention-based random access, and is always activated.

Logical Channel Prioritization (LCP):

LCP procedure is applied whenever a new transmission is performed. radio resource control (RRC) controls a scheduling of uplink data by signalling for each logical channel per MAC entity. RRC additionally controls the LCP procedure by configuring mapping restrictions for each logical channel.

In some embodiments, the BFR MAC CE is generated in a multiplexing and assembly procedure. The multiplexing and assembly procedure may comprise a logical channel prioritization (LCP) procedure.

Scheduling Request (SR):

SR is used for requesting UL-SCH resources for new transmission. The MAC entity may be configured with zero, one, or more SR configurations. An SR configuration consists of a set of PUCCH resources for SR across different bandwidth parts (BWPs) and cells. For a logical channel or for SCell beam failure recovery (BFR), at most one PUCCH resource for SR is configured per BWP. Each SR configuration corresponds to one or more logical channels and/or to SCell beam failure recovery. Each logical channel, SCell beam failure recovery may be mapped to zero or one SR configuration, which is configured by RRC. When an SR is triggered, it shall be considered as pending until it is cancelled.

Example

Beam Failure Detection and Recovery Procedure:

The MAC entity may be configured by RRC per serving Cell with a beam failure recovery procedure which is used for indicating to the serving gNB of a new synchronization signal/physical broadcast channel block (SSB) or control state information (CSI)-reference signal (RS) when beam failure is detected on the serving SSB(s)/CSI-RS(s). Beam failure is detected by counting beam failure instance indication from the lower layers to the MAC entity. If beamFailureRecoveryConfig is reconfigured by upper layers during an ongoing random access procedure for beam failure recovery for SpCell, the MAC entity shall stop the ongoing random access procedure and initiate a random access procedure using the new configuration.

FIG. 1 illustrates that, in some embodiments, a UE 10 transmits a SCell BFR MAC CE according to at least one of the followings.

(a) The UE 10 is allowed to transmit the SCell BFR MAC CE on any UL grant, and if there is only available UL grant on a failed SCell, the UE 10 triggers and transmits the BFR MAC CE with the UL grant on the failed SCell, at the same time, the UE 10 triggers a BFR SR. By doing this, the UE 10 may receive an UL grant scheduling in case the BFR MAC CE transmission failure.

(b) the UE 10 is allowed to transmit the SCell BFR MAC CE on any UL grant except the UL grant on the failed SCell. If there is no available UL grant except on the failed SCell, the UE 10 trigger the BFR SR to acquire UL grant for BFR MAC CE transmission; or if there is available UL grant on both failed SCell(s) and non-failed SCell(s), the UE 10 skips the available UL grant (for example, the UE 10 may regard this UL grant as an invalid grant) on failed SCell(s), and uses the available UL grant on non-failed SCell(s) for BFR MAC CE transmission.

Furthermore, if there are multiple available UL grants on non-failed SCell(s), the UE 10 can choose the UL grant in either of the following ways: UE implementation; choosing the closest available UL grant on time domain; or choosing the SCell with strongest radio condition.

If the BFR for SCell is triggered, the specification regarding 3GPP 38.321 section 5.17 can be added or changed as following:

For (a):
The MAC entity shall:
1> if the beam failure recovery (BFR) procedure determines that at least one BFR has been triggered and not cancelled:
2> if UL-SCH resources on a failed SCell are available for a new transmission and if the UL-SCH resources can accommodate the SCell BFR MAC CE plus its subheader as a result of logical channel prioritization (LCP):
3> instruct the multiplexing and assembly procedure to generate the SCell BFR MAC CE and trigger a scheduling request (SR) for SCell beam failure recovery.

For (b):
The MAC entity shall:
1> if the beam failure recovery (BFR) procedure determines that at least one BFR has been triggered and not cancelled:
2> if only UL-SCH resources on a failed SCell are available for a new transmission and if the UL-SCH resources can accommodate the SCell BFR MAC CE plus its subheader as a result of logical channel prioritization (LCP):
3> trigger a scheduling request (SR) for SCell beam failure recovery (BFR).
2> if UL-SCH resources on both failed SCell(s) and non-failed SCell(s) are available for a new transmission and if the UL-SCH resources can accommodate the SCell BFR MAC CE plus its subheader as a result of logical channel prioritization (LCP):
3> instruct the multiplexing and assembly procedure to generate the SCell BFR MAC CE on the non-failed SCell.

Further, the specification regarding 3GPP 38.321 section 5.17 can be added or changed as following:
The MAC entity shall:
1> if the beam failure recovery (BFR) procedure determines that at least one BFR has been triggered and not cancelled:
2> if UL-SCH resources are available for a new transmission and if the UL-SCH resources can accommodate the BFR MAC CE plus its subheader as a result of LCP:
3> instruct the multiplexing and assembly procedure to generate the BFR MAC CE.
2> else if UL-SCH resources are available for a new transmission and if the UL-SCH resources can accommodate the truncated BFR MAC CE plus its subheader as a result of LCP:
3> instruct the multiplexing and assembly procedure to generate the truncated BFR MAC CE.
2> else:
3> trigger the SR for SCell beam failure recovery for each SCell for which BFR has been triggered and not cancelled.

In some embodiments, all BFRs triggered prior to MAC protocol data unit (PDU) assembly for beam failure recovery for an SCell shall be cancelled when a MAC PDU is transmitted and this PDU includes a BFR MAC CE or truncated BFR MAC CE which contains beam failure information of that SCell.

In some embodiments, once a target receives a status report, the target can retransmit DL data based on the status report, and a redundant retransmission can be avoided by adding new triggers for the status report.

Commercial interests for some embodiments are as follows. 1. Solving issues in the prior art. 2. Providing MAC CE and/or SR transmission for BFR. 4. Providing a high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes.

Some embodiments of the present disclosure are a combination of "techniques/processes" that can be adopted in 3GPP specification to create an end product. Some embodiments of the present disclosure could be adopted in the 5G NR unlicensed band communications.

Some embodiments of the present disclosure propose technical mechanisms.

Figure 4:
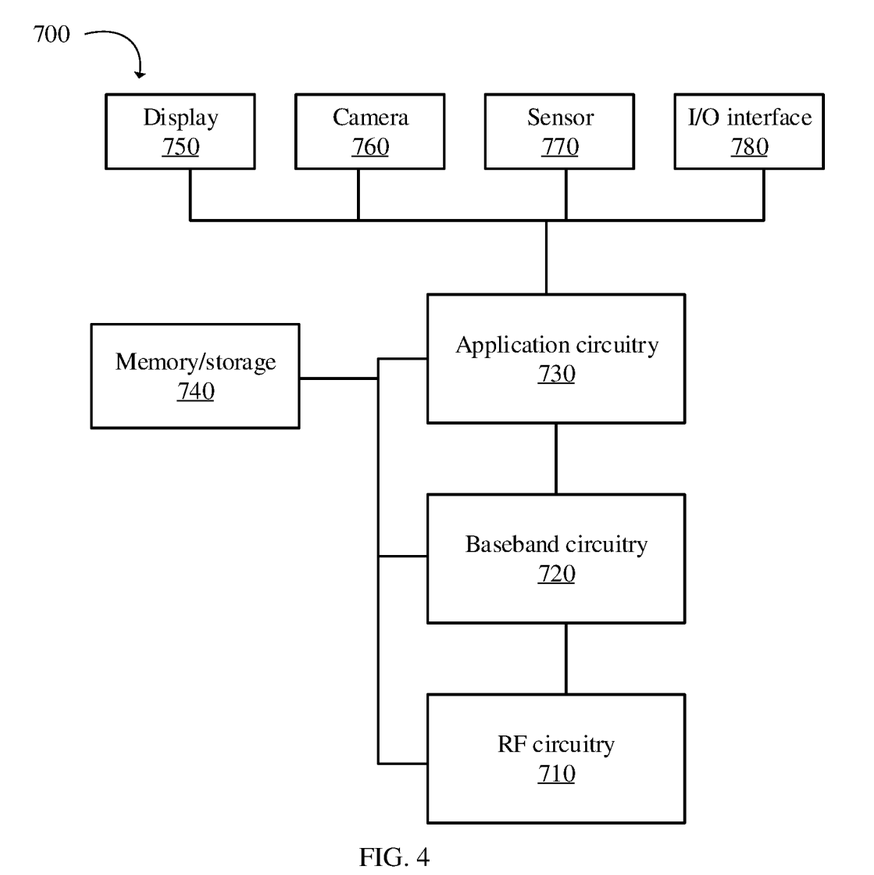
FIG. 4 is a block diagram of a system for wireless communication according to an embodiment of the present disclosure.

FIG. 4 is a block diagram of an example system 700 for wireless communication according to an embodiment of the present disclosure.

Embodiments described herein may be implemented into the system using any suitably configured hardware and/or software. FIG. 4 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc.

In some embodiments, the baseband circuitry may provide for communication compatible with one or more radio technologies.

For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN).

Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency.

For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium.

In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency.

For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality.

In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system.

In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display.

In various embodiments, the system 700 may be a mobile computing device such as, but not limited to, a laptop computing device, a tablet computing device, a netbook, an ultrabook, a smartphone, an AR/VR glasses, etc.

In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways.

The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:
    generating, by the UE, a beam failure recovery (BFR) medium access control (MAC) control element (CE) if the UE determines that at least one BFR has been triggered and not cancelled, uplink shared channel (UL-SCH) resources are available for a new transmission, and the UL-SCH resources can accommodate the BFR MAC CE plus its subheader as a result of logical channel prioritization (LCP), wherein the BFR MAC CE is generated in a multiplexing and assembly procedure;
    generating, by the UE, a truncated BFR MAC CE if the UE determines that at least one BFR has been triggered and not cancelled, if UL-SCH resources are available for a new transmission and if the UL-SCH resources can accommodate the truncated BFR MAC CE plus its subheader as a result of LCP;
    otherwise, triggering a scheduling request (SR) for secondary cell (SCell) beam failure recovery for each SCell for which BFR has been triggered and not cancelled if the UE determines that at least one BFR has been triggered and not cancelled.

2. The method of claim 1, comprising that the at least one BFR has been triggered and not cancelled is determined in a BFR procedure.

3. The method of claim 1, wherein the BFR MAC CE comprises SCell BFR MAC CE.

4. The method of claim 1, wherein if there are multiple available UL grants on a non-failed SCell, the UE chooses the UL grant on the non-failed SCell according to a closest available UL grant on time domain.

5. A user equipment (UE), comprising:
    a memory;
    a transceiver; and
    a processor coupled to the memory and the transceiver;
    wherein the processor performs generating beam failure recovery (BFR) medium access control (MAC) control element (CE) if the processor determines that at least one BFR has been triggered and not cancelled, uplink shared channel (UL-SCH) resources are available for a new transmission, and the UL-SCH resources can accommodate the BFR MAC CE plus its subheader as a result of logical channel prioritization (LCP), wherein the BFR MAC CE is generated in a multiplexing and assembly procedure;
    the processor performs generating a truncated BFR MAC CE if the processor determines that at least one BFR has been triggered and not cancelled, UL-SCH resources are available for a new transmission, and the UL-SCH resources can accommodate the truncated BFR MAC CE plus its subheader as a result of LCP;
    otherwise, the processor performs triggering a scheduling request (SR) for secondary cell (SCell) beam failure recovery for each SCell for which BFR has been triggered and not cancelled if the processor determines that at least one BFR has been triggered and not cancelled.

6. The UE of claim 5, comprising that the at least one BFR has been triggered and not cancelled is determined in a BFR procedure.

7. The UE of claim 5, wherein the BFR MAC CE comprises a SCell BFR MAC CE.

8. The UE of claim 5, wherein if there are multiple available UL grants on a non-failed SCell, the processor chooses the UL grant on the non-failed SCell according to a closest available UL grant on time domain.

9. A base station, comprising:
a memory;
a transceiver; and
a processor coupled to the memory and the transceiver;
wherein the transceiver receives, from a user equipment (UE), a beam failure recovery (BFR) medium access control (MAC) control element (CE) at least one BFR has been triggered and not cancelled, uplink shared channel (UL-SCH) resources are available for a new transmission, and the UL-SCH resources can accommodate the BFR MAC CE plus its subheader as a result of logical channel prioritization (LCP), wherein the BFR MAC CE is generated in a multiplexing and assembly procedure;
the transceiver receives, from the UE, a truncated BFR MAC CE if at least one BFR has been triggered and not cancelled, UL-SCH resources are available for a new transmission, and the UL-SCH resources can accommodate the truncated BFR MAC CE plus its subheader as a result of LCP;
otherwise, the transceiver receives, from the UE, a scheduling request (SR) for secondary cell (SCell) beam failure recovery for each SCell for which BFR has been triggered and not cancelled if at least one BFR has been triggered and not cancelled.

10. The base station of claim 9, comprising that the at least one BFR has been triggered and not cancelled is determined in a BFR procedure.

11. The base station of claim 9, wherein the BFR MAC CE comprises a SCell BFR MAC CE.

* * * * *